United States Patent [19]

Li

[11] Patent Number: 5,159,971
[45] Date of Patent: Nov. 3, 1992

[54] COOLING MEDIUM FOR USE IN A THERMAL ENERGY STORAGE SYSTEM

[75] Inventor: Chien C. Li, East Aurora, N.Y.

[73] Assignee: Allied-Signal Inc., Morris Township, Morris County, N.J.

[21] Appl. No.: 722,428

[22] Filed: Jun. 27, 1991

[51] Int. Cl.$^5$ .............................................. F28D 20/00
[52] U.S. Cl. .................................. 165/10; 165/104.17; 62/59; 252/70
[58] Field of Search ................. 165/10, 104.17; 62/59; 252/70

[56] References Cited

U.S. PATENT DOCUMENTS

| | | | |
|---|---|---|---|
| 4,332,690 | 6/1982 | Kimura et al. | 165/10 |
| 4,540,501 | 9/1985 | Ternes et al. | 252/70 |
| 4,821,794 | 4/1989 | Tsai et al. | 165/10 |

OTHER PUBLICATIONS

"Use of Clathrates for Off-Peak Thermal Energy Storage", Richard McCormick, Proc. InterSoc. Energy Convers. Eng. Conf., 1990, vol. 4, pp. 300–305.

Primary Examiner—Albert W. Davis, Jr.
Attorney, Agent, or Firm—Karen A. Harding

[57] ABSTRACT

An improved cooling medium for use in a thermal energy storage system is disclosed. The cooling medium comprises water, 1-fluoro-1,1-dichloroethane (HCFC-141b), as the guest molecule and a surfactant selected from the group consisting of DRSC®, EMPHOS PS-21A®, MAPHOS L13®, or MAZEEN C-Z®, PO-E(2) COCOAMINE. It has been found that any of the above surfactants, and preferably DRSC® and EMPHOS PS-21A® encourage clathrate formation at surfactant concentrations far below 300 ppm. Clathrate formation, and the overall efficiency of the thermal energy storage system is increased when the cooling medium of the present invention is used.

19 Claims, No Drawings

COOLING MEDIUM FOR USE IN A THERMAL ENERGY STORAGE SYSTEM

SUMMARY OF THE INVENTION

The present invention discloses an improved clathrate forming mixture for use in a thermal energy storage system. By using 1-fluoro-1,1-dichloroethane (HCFC 141b) and a surfactant selected from a critically defined group of surfactants, it has been found that a smaller amount of these surfactants is required, and that less of the guest molecule is lost associating with the surfactant. Accordingly, the efficiency of clathrate formation, and of the thermal energy storage system is increased.

BACKGROUND OF THE INVENTION

The use of air conditioners during the summer months requires large quantities of energy primarily during the daytime hours when other forms of energy consumption are also high. Peaking generators are required to increase electricity generating capacity so that power loads are met. However, energy consumption decreases dramatically at night, and the peaking generators are not needed. Thus, the expensive peaking generators are run only half the time, decreasing the efficiency of the power facility. To alleviate this problem, thermal energy storage systems, which can utilize off peak, night-time electricity have been proposed.

Thermal energy storage systems contain a cooling medium, which is frozen during the off peak, evening hours. During the daytime, heat from the surrounding area is used to melt the cooling medium. The removal of heat to drive the decomposition causes the surrounding area to become cooler.

The use of ice and water as the cooling medium is an ancient practice Even today, the third world countries still use ice and water to condition air in the summer. However, the systems using water are inefficient and bulky. Extraction of sensible heat is inefficient due to the specific heat of water. Ice is also an undesirable heat extraction medium because the low freezing temperature requires large quantities of energy for refrigeration.

Hydrate systems, such as $Na_2SO_4 \cdot 10H_2O$ have also been disclosed. However, in operation, the hydrates tend to segregate after a few cycles. In addition such hydrates are inefficient and corrosive to the system.

U.S. Pat. No. 4,540,501 discloses a thermal energy storage system which uses clathrates as the cooling medium. Clathrates are hydrates which use a non-stoichiometric number of water molecules per guest molecule. The guest molecule fills the interior of the lattice, stabilizing the clathrate. This stabilization allows the water lattice structure to form at temperatures significantly higher than the temperature of ice formation (0° C.). The guest molecule must be highly insoluble in water, and must have a molecular size which is less than 7 Å. In U.S. Pat. No. 4,540,501 the guest molecule is a refrigerant chosen from brominated, chlorinated and fluorinated hydrocarbons including $CCl_2F_2$, $CCl_3F$, $CBrF_3$, $CHCl_2F$, $CHClF_2$, $CH_2ClF$ and $CH_3CClF_2$. The surfactant used is generally described as a nonionic fluorosurfactant having the chemical formula $F(CF_2CF_2)_{3-8}CH_2CH_2O(CH_2CH_2O)_{9-11}H$.

The halogenated hydrocarbons which are used as the guest molecules are not water miscible. Clathrates will not form unless the guest and host (lattice) compounds are in contact. In an attempt to bring the guest molecule and water into closer contact, various surfactants have been added. However, for the known guest molecules relatively large quantities of surfactant are required (on the order of 300 ppm) and some of the guest molecule will associate with the surfactant instead of forming a clathrate with water. This decreases the efficiency of the thermal energy storage system.

Accordingly, it is the goal of the present invention to provide guest molecule-surfactant combinations with good energy storage capacity (high disassociation energy and high decomposition temperatures) which minimize the amount of guest molecule which associate with the surfactant. Particularly, it is the goal of the present invention to find surfactants which at levels much lower than 300 ppm can effectively form an emulsion between the water and the guest molecules. Such a cooling medium would increase the overall efficiency of the thermal energy storage system.

Furthermore, many of the guest molecules presently being used are CFCs such as trichlorofluoromethane (CFC-11). The use of these compounds is becoming disfavored because of the detrimental effect to the ozone layer. Thus it is a goal of the present invention to find a cooling medium which poses less of a threat to the ozone layer. Halohydrocarbons such as HCFC 141b which contain hydrogen, and are believed to pose less of a threat to the ozone layer, and are thus proposed as the guest molecule in clathrate formation according to the present invention.

DETAILED DESCRIPTION OF THE INVENTION

The present invention provides an improved cooling medium for use in a thermal energy storage system. The improvement of the present invention resides in the recognition of several surfactants which more efficiently bring into contact water and the guest molecule. Less surfactant is required, and accordingly, much less of the guest molecule is removed from clathrate formation due to association with the surfactant.

More particularly, the guest molecule of the present invention is 1-fluoro-1,1-dichloroethane (HCFC-141b) and the surfactant is selected from certain cationic and non-ionic surfactants. As little as 25 ppm of the surfactants are required to form the necessary emulsion.

The configuration of the thermal energy storage system of the present invention is the same as that of U.S. Pat. No. 4,540,501.

To form a clathrate the guest molecule and water must be dissimilar and be in contact with each other. The more intimate the contact, the more efficient the clathrate formation will be. Accordingly, emulsions of water and the guest molecule are highly desirable.

Clathrates of the present invention are formed from the guest molecule, HCFC-141b and water. An effective amount of each HCFC-141b and water must be present to insure clathrate formation. Preferably, a slight excess of water is used to maintain a slurry, and ensure continuous and efficient heat transfer. In practice, 20 moles of water is used for each 1 mole of HCFC 141b.

The surfactant species which have been found most effective in enhancing emulsion formation where 141b is used as the guest molecule are either cationic or non-ionic. The cationic surfactant is DRSC® (alkyl dimethyl benzyl ammonium salt of octaphenyl phosphoric acid, which is commercially available from Allied-Signal, Inc.). Suitable anionic surfactants may be chosen from EMPHOS PS-21A ® (alkyl organic phosphate ester acid in phosphoric acid, which is commercially available from WITCO), MAPHOS L13 ® (approximately 98% organo phosphate ester in approximately 2% phosphoric acid which is commercially available from PPG) and MAZEEN C-Z ® POE(2) COCOAMINE (approximately 100% ethoxylated alkyl amine which is commercially available from PPG). Of these surfactants DRSC ® and EMPHOS PS-21A ® are preferred. Physical properties of the foregoing surfactants are listed in Table 1 below.

TABLE 1

| Surfactant | Boiling Point °F. | Specific Gravity @ 25° C. | Vapor Pressure mm Hg @ 25° C. | Solubil. in H$_2$O at 25° C. |
|---|---|---|---|---|
| DRSC | 180° | 0.95 | <1 | Soluble |
| EMPHOS PS-21A | NA | 0.192 | <1 | Soluble |
| MAPHOS 43 | >300 | 1.05 | <1 | Insol |
| MAZEEN C-Z | >300 | 1.015 | <1 | Dispersible |

*at 10 mm Hg

It has been found that less than 300 ppm of the chosen surfactant is required to insure emulsion formation. Preferably less than 100 ppm surfactant is used, and most preferably between about 50 ppm and 25 ppm of any of the above surfactants is used. The losses of the guest molecule (HCFC 141b) due to association with the surfactant decrease as the amount of surfactant used is decreased, thereby increasing the efficiency of clathrate formation, and the thermal energy storage system.

Agitation is not required to ensure clathrate formation of the cooling medium of the present invention. However, agitation may be used to further encourage clathrate formation.

Emulsions formed according to the present invention are stable at room temperature, and remain emulsified for as long as two days with minimum drainage. The clathrate is formed in a storage tank/crystallizer. The pressure in the crystallizer is decreased by means of a compressor, as described in more detail in U.S. Pat. No. 4,540,501, and heat is removed until the temperature of formation for the clathrate is reached. The pressure and temperature are maintained until all of the clathrate is formed. The clathrate is circulated through the heat exchanger via the recirculation loop. Clathrate is circulated through the heat exchanger, decomposed, and the water and guest molecule mixture is returned to the crystallizer.

EXAMPLE

A solution of each of the four surfactants according to the invention having a concentration of 25 ppm surfactant was made by adding 0.025 ml of each surfactant to 1 l of water. 300 ml of each of the surfactant solutions were poured into a 500 ml jar, and 30 ml of 141(b) were added to each jar. The jars were capped and shaken vigorously for 1 minute. An emulsion formed in each jar, and each emulsion was stable and remained emulsified for two days without noticeable drainage.

Each of the sealed jars was placed in a freezer at 40° F. A considerable amount of snowflake-like crystals (the clathrate) was observed in the jars containing DRSC ® and EMPHOS ® surfactants after 1.0 hour. The jars were left in the freezer overnight. By morning crystals had formed in each of the jars, indicating that clathrate had formed in each of the surfactant containing jars. However, more clathrate was observed in the jars containing DRSC ® and EMPHOS ® than in the jars containing MAPHOS L13 ®, MAZEEN C-Z ® POE(2) COCOAMINE ®.

Accordingly, all of the foregoing surfactants are demonstrated suitable aids for clathrate formation. However, more clathrate was formed, at faster rates using the DRSC ® and EMPHOS ® than was formed when the same amount of either MAPHOS L13 ®, or MAZEEN C-Z ® POE(2) COCOAMINE was used. Because DRSC ® and EMPHOS ® can form more clathrate at lower surfactant concentrations, there will be less surfactant to associate with the guest molecule (here 141b), and thus the clathrate formation process, and the thermal energy storage system will be more efficient.

The specification and examples described herein are to be construed as illustrative and not enumerative. Various modifications and changes may be made without departing from the true scope of the invention, which is defined by the following claims.

I claim:

1. In a thermal energy storage system having a crystallizer compartment containing a clathrate forming cooling medium, a means for circulating the cooling medium through a heat exchanger and a means for lowering the temperature in said crystallizer compartment; the improvement comprising:
   using as said clathrate forming cooling medium a mixture comprising water, 1-fluoro-1,1-dichloroethane and a surfactant selected from the group consisting of DRSC ®, EMPHOS PS-21A ®, MAPHOS L13 ®.

2. The system of claim 1 wherein the surfactant is DRSC ®.

3. The system of claim 1 wherein the surfactant is EMPHOS PS-21A.

4. The system of claim 1 wherein the surfactant is MAPHOS L13 ®.

5. The system of claim 1 wherein the amount of said surfactant used is less than 300 ppm.

6. The system of claim 1 wherein the amount of said surfactant used is less than 100 ppm.

7. The system of claim 1 wherein the amount of said surfactant used is between about 25 ppm and about 50 ppm.

8. In a process for thermal energy storage wherein a cooling medium is induced to form a clathrate, and heat is removed from the surroundings to melt the clathrate; the improvement comprising:
   using as said cooling medium a mixture comprising water, 1-fluoro-1,1-dichloroethane and a surfactant selected from the group consisting of DRSC ®, EMPHOS PS-21A ®, MAPHOS L13 ®.

9. The system of claim 8 wherein the surfactant is is DRSC ®.

10. The process of claim 8 wherein the surfactant is EMPHOS PS-21A ®.

11. The process of claim 8 wherein the surfactant is MAPHOS L13 ®.

12. The process of claim 8 wherein the amount of said surfactant used is less than 300 ppm.

13. The process of claim 8 wherein the amount of said surfactant used is less than about 100 ppm.

14. The process of claim 8 wherein the amount of said surfactant used is between about 25 ppm and about 50 ppm.

15. A cooling medium for use in a thermal energy storage system comprising water, 1-fluoro-1,1-dichloroethane and a surfactant selected from the group consisting of DRSC®, EMPHOS PS-21A®, MAPHOS L13®.

16. The cooling medium of claim 15 wherein the surfactant is DRSC®.

17. The cooling medium of claim 15 wherein the surfactant is EMPHOS PS-21A®.

18. The cooling medium of claim 15 wherein the amount of said surfactant used is less than about 100 ppm.

19. The cooling medium of claim 15 wherein the amount of said surfactant used is between about 25 ppm and about 50 ppm.

* * * * *